US012458550B2

United States Patent

(12) United States Patent
Galer et al.

(10) Patent No.: US 12,458,550 B2
(45) Date of Patent: Nov. 4, 2025

(54) COVER ASSEMBLY

(71) Applicant: Stryker Corporation, Kalamazoo, MI (US)

(72) Inventors: James K. Galer, Byron Center, MI (US); Patrick Lafleche, Kalamazoo, MI (US); Justin Jon Raymond, Jackson, MI (US); Spencer Baird, Mattawan, MI (US)

(73) Assignee: Stryker Corporation, Portage, MI (US)

( * ) Notice: Subject to any disclaimer, the term of this patent is extended or adjusted under 35 U.S.C. 154(b) by 266 days.

(21) Appl. No.: 17/953,625

(22) Filed: Sep. 27, 2022

(65) Prior Publication Data

US 2023/0016294 A1 Jan. 19, 2023

Related U.S. Application Data

(62) Division of application No. 17/119,063, filed on Dec. 11, 2020, now Pat. No. 11,547,621.

(60) Provisional application No. 62/947,128, filed on Dec. 12, 2019.

(51) Int. Cl.

*A61G 7/00* (2006.01)
*A61G 7/07* (2006.01)
*A61G 7/075* (2006.01)

(52) U.S. Cl.

CPC .............. *A61G 7/001* (2013.01); *A61G 7/072* (2013.01); *A61G 7/0755* (2013.01)

(58) Field of Classification Search

None

See application file for complete search history.

(56) References Cited

U.S. PATENT DOCUMENTS

| | | | | |
|---|---|---|---|---|
| 4,685,163 | A * | 8/1987 | Quillen | A47C 27/081 5/613 |
| 5,966,762 | A | 10/1999 | Wu | |
| 9,867,476 | B1 * | 1/2018 | Thomas | A47C 27/083 |
| 2020/0100965 | A1 | 4/2020 | Lafleche et al. | |
| 2020/0100967 | A1 | 4/2020 | Galer et al. | |
| 2021/0154069 | A1 | 5/2021 | Davis | |
| 2021/0177678 | A1 | 6/2021 | Galer et al. | |

FOREIGN PATENT DOCUMENTS

| | | | | |
|---|---|---|---|---|
| EP | 2948028 | B1 * | 12/2018 | A47G 9/0207 |

* cited by examiner

*Primary Examiner* — Adam C Ortiz

(74) *Attorney, Agent, or Firm* — Howard & Howard Attorneys PLLC

(57) ABSTRACT

A cover assembly for a patient support including a top portion with the top portion defining a patient support surface and a sealing surface opposite the patient support surface. The cover assembly further includes a bottom portion defining a plurality of open face chambers with each open face chamber including a floor and a plurality of walls extending from the floor towards the top portion. Each open face chamber is connected to, and integral with, at least one additional open face chamber by a hinge. The sealing surface of the top portion covers the open face chambers and is coupled to the bottom portion at each hinge.

11 Claims, 10 Drawing Sheets

COVER ASSEMBLY

CROSS REFERENCE TO RELATED APPLICATIONS

This application is a Divisional of U.S. patent application Ser. No. 17/119,063, filed on Dec. 11, 2020, which claims priority to and all the benefits of U.S. Provisional Patent Application No. 62/947,128, filed on Dec. 12, 2019, the disclosures of each of which are hereby incorporated by reference in their entirety.

BACKGROUND

Conventional cover assemblies for patient supports are traditionally merely a top portion and a bottom portion joined together for the purpose of encapsulating structural support materials. In addition, conventional cover assemblies are often laborious to produce and require many manufacturing steps.

A cover assembly designed to address one or more of the aforementioned deficiencies is desired.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Embodiment 1

Figure 1:
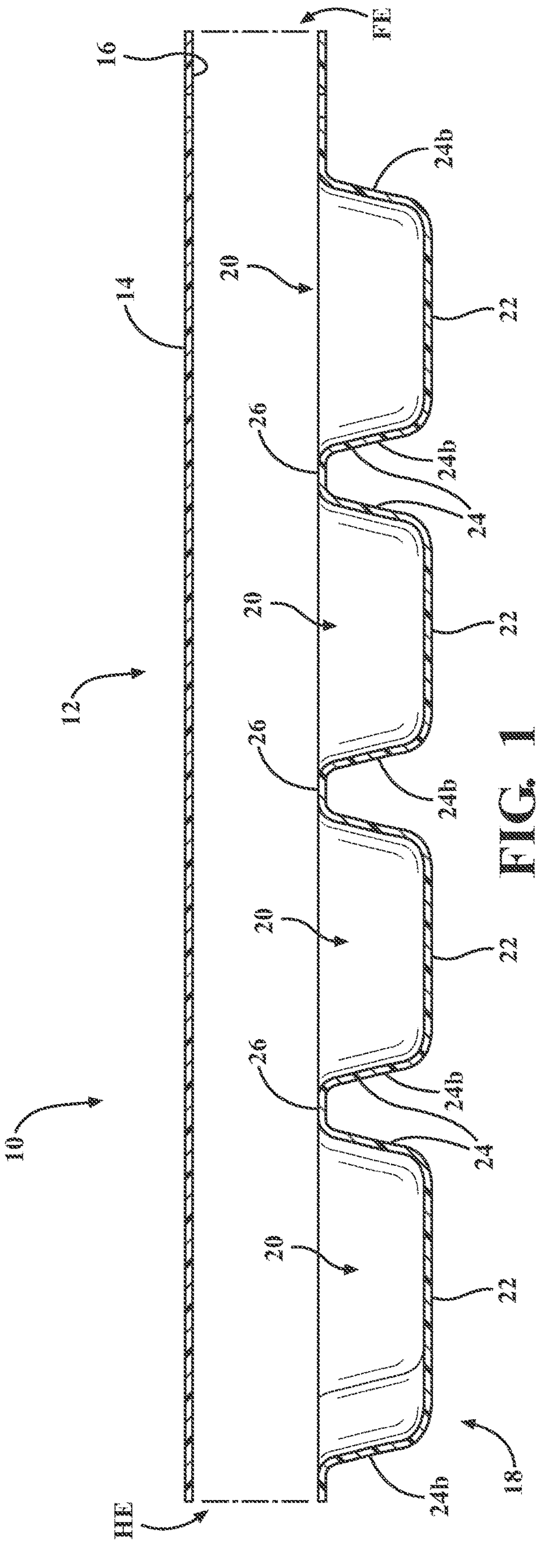
FIG. 1 is a cross-sectional side view of a first embodiment of a cover assembly with a bottom portion shown spaced from a top portion.
Figure 2:
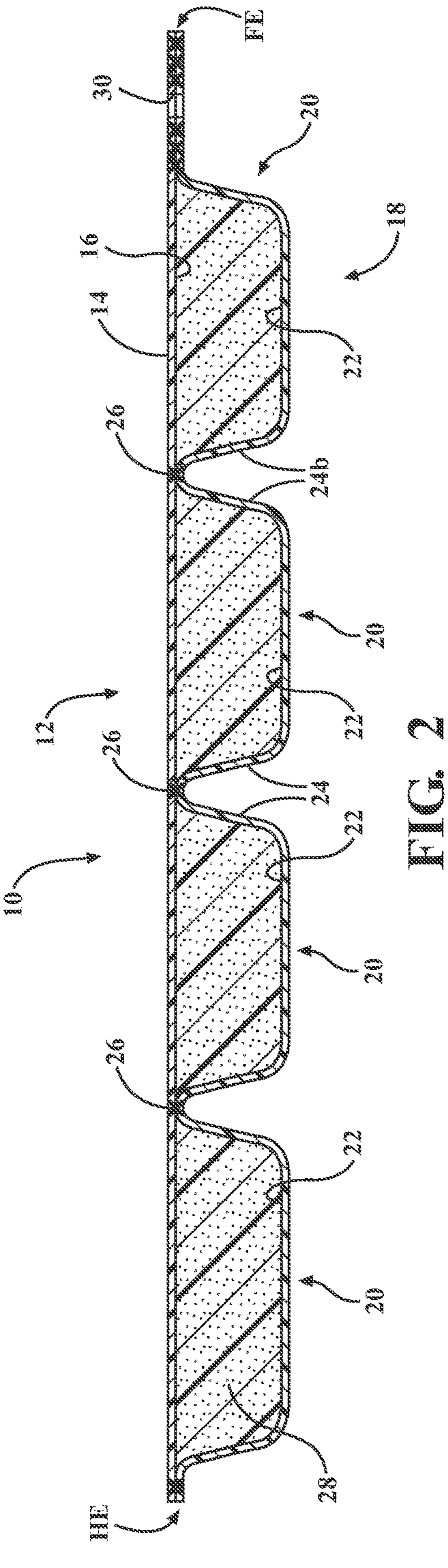
FIG. 2 is a cross-sectional side view of the first embodiment of the cover assembly with the bottom portion joined with the top portion.

FIGS. 1 and 2 illustrate a cover assembly 10 for a patient support (not shown) in accordance with a first embodiment of the present disclosure. The cover assembly 10 includes a top portion 12 defining a patient support surface 14 and a sealing surface 16 opposite the patient support surface 14. As best shown in FIG. 1, the patient support surface 14 of the top portion 12 of the cover assembly 10 is observable to, and makes contact with a patient, whereas the sealing surface 16 is typically not visible to the patient and faces a bottom portion 18 of the cover assembly 10.

Referring still to FIGS. 1 and 2, the bottom portion 18 defines a plurality of open face chambers 20. For example, the bottom portion 18 may define from two to eight open face chambers 20. Although there is no limit to the number of open face chambers 20 defined by the bottom portion 18, typically, the bottom portion 18 defines three to five open face chambers 20. Each open face chamber 20 includes a floor 22 and a plurality of walls 24 extending from the floor 22 towards the top portion 12. Each open face chamber 20 is connected to, and integral with, at least one additional open face chamber 20 by a hinge 26. Finally, the sealing surface 16 of the top portion 12 covers the open face chambers 20 and is coupled to the bottom portion 18 at each hinge 26.

Referring back to the patient support, the patient support is typically a mattress. The mattress may include a foam material that is placed in the open face chambers 20 of the bottom portion 18 before the top portion 12 is coupled with the bottom portion 18. In other words, when the cover assembly 10 is filled with a material, such as a foam material, the cover assembly 10 may be generally referred to as a patient support or a mattress. Of course, the cover assembly 10 of the first embodiment is not limited to any particular patient support, and may be filled with materials other than foam. For example, the patient support may include pressurized air cells, gels, and the like. The patient support is typically supported on a patient support apparatus (not shown) such as a hospital bed, stretcher, cot, trolley, gurney, wheelchair, recliner, chair, table, or other suitable support or transport apparatus.

Figure 3:
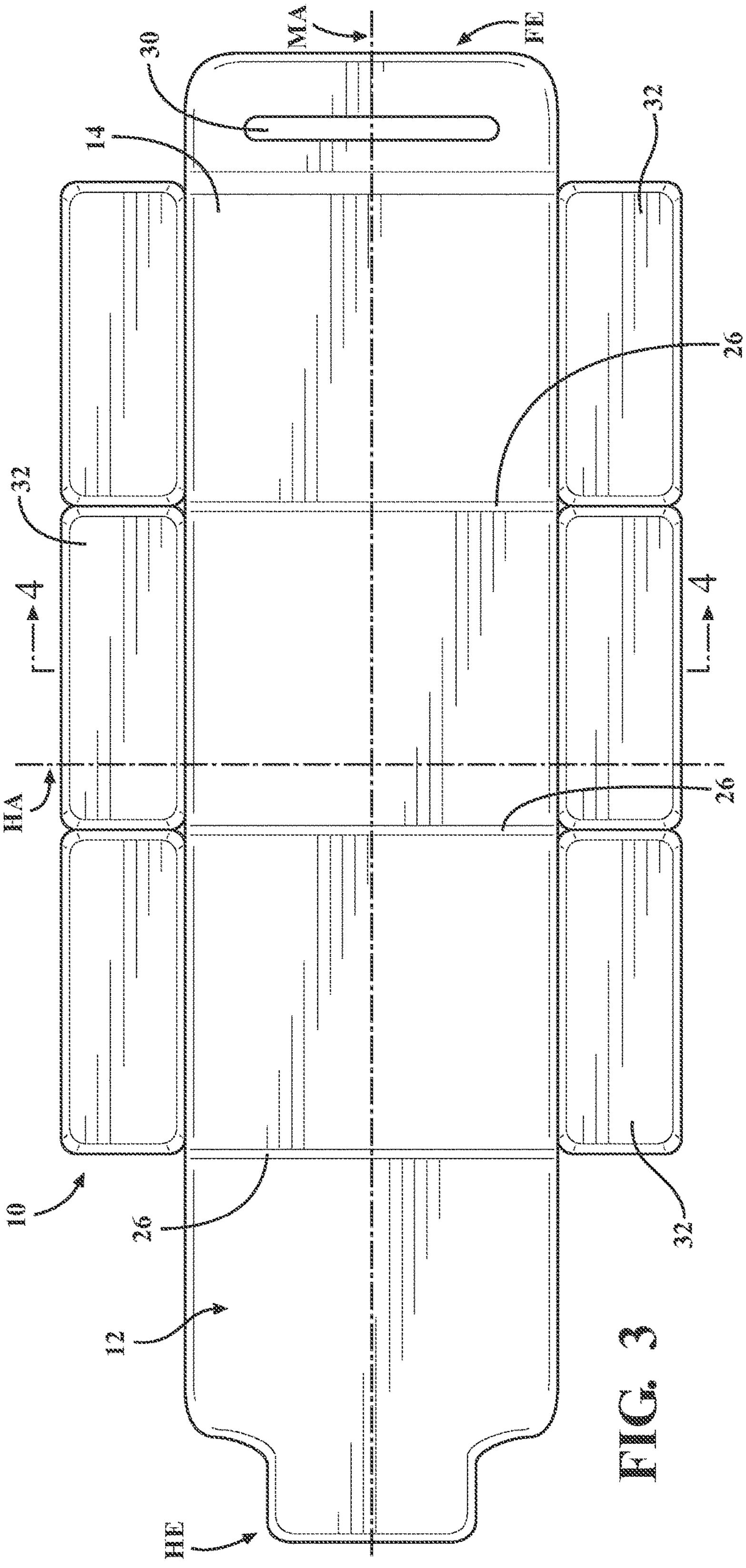
FIG. 3 is a top view of the first embodiment of the cover assembly including optional horizontal expansion portions.

Referring back to the cover assembly 10, as shown in FIG. 3, the cover assembly 10 includes a head end (HE) and a foot end (FE), with a main axis (MA) extending between the foot end (FE) and the head end (HE). The cover assembly 10 also has a horizontal axis (HA) extending between a left side of the cover assembly 10 and a right side of the cover assembly 10 with the horizontal axis (HA) being substantially perpendicular to the main axis (MA).

Referring to FIGS. 1-3, typically, the plurality of open face chambers 20 of the bottom portion 18 are spaced from each other along the main axis (MA). As described above, each open face chamber 20 includes the floor 22 and the plurality of walls 24 extending from the floor 22 towards the top portion 12 of the cover assembly 10. Although not required, typically, each open face chamber 20 includes two side walls 24*a* (FIG. 4), with each side wall 24*a* extending parallel to the main axis (MA) and facing in the direction of the horizontal axis (HA). In addition, typically each open face chamber 20 also includes two end walls 24*b* (FIGS. 1 and 2) extending along the horizontal axis (HA) and facing the direction of the main axis (MA). As shown collectively in FIGS. 2 and 4, the open face chambers 20 may have a rectangular cross-section.

As best shown in FIG. 2 and described above, each open face chambers 20 is connected to, and integral with, at least one additional open face chamber 20 by the hinge 26. For example, the open face chamber 20 at each end of the cover assembly 10 may only be connected to, and integral with, a single additional open face chamber 20. Conversely, an interior open face chamber 20 (i.e., open face chambers not located at the ends) is typically connected to, and integral with, two additional open face chambers 20.

Referring now to the hinge 26 with continued reference to FIG. 2, the hinge 26 connects, and makes integral, each open face chamber 20 to another open face chambers 20. The hinge 26 permits an open face chamber 20 to move relative to another open face chamber 20. For example, the hinge 26 may allow a first open face chamber 20 to rotate about the hinge 26 with the adjacent open face chamber 20 remaining stationary or at least without being forced to rotate to the same extent as the first open face chamber 20.

As best shown in FIG. 1, the hinge 26 is typically located at a distal end of the end wall 24*b* of each open face chamber 20. For example, the hinge 26 may connect an end wall 24*b* of one open face chamber 20 to an end wall 24*b* of another open face chamber 20. Generally, adjacent open face chambers 20 do not share an end wall 24*b*. Instead, the open face chambers 20 typically have separate end walls 24*b* with adjacent end walls 24*b* being connected and integral with each other via the hinge 26. The hinge 26 is typically formed from the same material as the entire bottom portion 18 of the cover assembly 10 (described further below). The hinge 26 may be a resilient hinge, meaning the hinge 26 may have a tendency to return to its initial (i.e., rest) position after an applied force is removed. The hinge 26 may also be a living hinge, meaning the thickness of the bottom portion 18 of the cover assembly 10 becomes thinner at the hinge 26, which mechanically allows one open face chamber 20 to move relative to another open face chamber 20.

As best shown in FIGS. 1 and 2, the hinge 26 generally has a rounded/bent configuration and appears convex (or at least has a portion thereof) to an observer viewing the bottom portion 18 of the cover assembly 10 (removed from the top portion 12) from above (i.e., at the location of the top portion 12). As best shown in FIG. 3, the hinge 26 generally extends parallel to the horizontal axis (HA) and substantially perpendicular to the main axis (MA). However, the hinge 26 is not limited to any particular geometric configuration and/or orientation. For example, the hinge 26 shown in FIG. 1 has a slightly different configuration than the hinge 26 shown in FIG. 2, with the hinge 26 shown in FIG. 1 having linear and convex portions and the hinge 26 shown in FIG. 2 having a constant radius of curvature.

As described above, top portion 12 of the cover assembly 10 includes the sealing surface 16, which covers the open face chambers 20. The sealing surface 16 is coupled to each hinge 26 thereby coupling the bottom portion 18 of the cover assembly 10 to the top portion 12 of the cover assembly 10. Typically, the sealing surface 16 is also coupled to at least one wall of the plurality of walls 24 of the open face chambers 20. For example, the sealing surface 16 may be coupled to each hinge 26 and also coupled to each side wall 24*a* of each open face chamber 20. It should also be appreciated that when the sealing surface 16 covers the open face chambers 20, the sealing surface 16 may not necessarily "seal" the open face chambers 20. For example, air may still be capable of passing into and out of the open face chamber 20 despite the open face chamber 20 being covered by the sealing surface 16.

As shown in FIG. 2, the open face chambers 20 may also be filled with a support material 28. The support material 28 may be a foam, gel, air cells, or any other suitable material or method for filling the open face chambers 20. Typically, the open face chambers 20 are filled with the support material 28 prior to covering the open face chambers 20 with the sealing surface 16.

As shown in FIGS. 2 and 3, the cover assembly 10 may also include a slot 30 for securing a sheet (not shown) to the cover assembly 10. When included, the slot 30 provides an easy and quick attachment method for securing or anchoring the sheet to the cover assembly 10. It should be noted that in FIGS. 2 and 3, the size of the slot 30 is exaggerated for ease of viewing. In practice, the slot 30 would be significantly thinner and may require a modest force to open. This configuration increases the likelihood that once the sheet is secured in the slot 30, the sheet will remain in the slot 30 until intentionally removed. This is particularly useful when one open face chamber 20 moves about the hinge 26 relative to an adjacent open face chamber 20, which absent the slot 30 may dislodge the sheet. In addition, although FIGS. 2 and 3 display the slot 30 at the foot end (FE) of the cover assembly 10, it should be appreciated that the slot 30 may be positioned at any location of the cover assembly 10. For example, the cover assembly 10 may include the slot 30 at the head end (HE), foot end (FE), and multiple slots 30 along the sides of the cover assembly 10.

Figure 4:
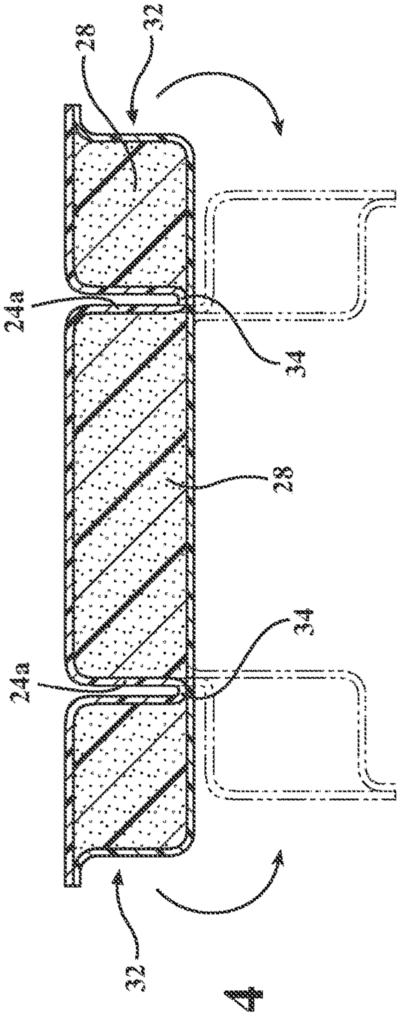
FIG. 4 is a cross-sectional front view of the cover assembly taken along line 4-4 in FIG. 3.

Although not required, as shown in FIGS. 3 and 4, the cover assembly 10 may include at least one horizontal expansion portion 32. In particular, at least one open face chamber 20 may be coupled to a horizontal expansion portion 32 about a secondary hinge 34. The secondary hinge 34 typically extends parallel to the main axis (MA) and substantially perpendicular to the horizontal axis (HA). In other words, the secondary hinge 34 typically extends perpendicular to the hinge 26.

The secondary hinge 34 may be attached to the open face chamber 20 at any location. However, typically the secondary hinge 34 is attached to a side wall 24*a* of the open face chamber 20 adjacent the floor 22, as shown in FIG. 4. Alternatively, the secondary hinge 34 may be attached to the floor 22 of the open face chamber 20 adjacent the side wall 24*a*.

Although the horizontal expansion portion 32 may have any geometric configuration, the horizontal expansion portion 32 generally resembles an open face chamber 20 with a cover. The horizontal expansion portion 32 may also be formed form the same material as the open face chambers 20, such that the entire cover assembly 10 is formed of the same material. Similarly, the horizontal expansion portion 32 may also be filled with the same support material 28 as the open face chambers 20.

As shown in FIG. 4, the horizontal expansion portion 32 is capable of rotating about the secondary hinge 34 to cooperate with the patient support surface 14 and support a patient. Generally, the horizontal expansion portion 32 is used to accommodate a relatively larger patient. Accordingly, including the horizontal expansion portion 32 may increase the versatility of the cover assembly 10 as a single cover assembly 10 may be used to support multiple patient body types, which has conventionally required two or more cover assemblies.

The top portion 12 of the cover assembly 10 may be coupled/secured with the bottom portion 18 of the cover assembly 10 by any suitable method. For example, a radio frequency or ultra-sonic welding technique may be used to weld the top portion 12 of the cover assembly 10 to the bottom portion 18 of the cover assembly 10. Alternatively, an adhesive or physical stitching may be used to couple/secure the top portion 12 of the cover assembly 10 with the bottom portion 18 of the cover assembly 10.

The cover assembly 10 is typically formed from a thermoplastic, elastic, or viscoelastic, polymer material. Typically, the polymeric material of the cover assembly 10 is not particularly limited. However, the polymeric material should be selected to have adequate elongation properties when the cover assembly 10 is formed via a thermoforming process. Suitable examples include PVC, thermoplastic urethanes TPUs, polyurethane coated PVC, polyurethane coated substrates, etc.

The present disclosure also provides a method of forming the cover assembly 10 of embodiment 1. The method includes thermoforming the bottom portion 18 of the cover assembly 10 including the open face chambers 20. Any suitable thermoforming technique, such as plug assist thermoforming, may be used. The method further includes filling the open face chambers 20 with the fill material 28, such as a foam, gel, or air cell. The method further includes thermoforming the top portion 12 of the cover assembly 10. The method further includes coupling the top portion 12 of the cover assembly 10 with the bottom portion 18 of the cover assembly 10 at the hinges 26. Typically, coupling the top and bottom portions 12, 18 is accomplished via a radio frequency or ultra-sonic welding technique.

The method may further include forming at least one slot 30 in corresponding top and bottom portions 12, 18 of the cover assembly 10. The slot 30 may be formed during the thermoforming process or may be formed after the bottom portion 18 is coupled with the top portion 12.

The method may further include attaching at least one horizontal expansion portion 32 to the bottom portion 18 of the cover assembly 10 via a radio frequency or ultra-sonic welding technique. Alternatively, the method may include thermoforming the horizontal expansion portion 32 (or at least a portion thereof) while simultaneously thermoforming the bottom portion 18.

As an alternative configuration of embodiment 1 of the cover assembly 10, the bottom portion 18 of the cover assembly 10 includes a single open face chamber 20 and is sealed with the top portion 12 to form the cover assembly 10. In this alternative configuration, each component of the cover assembly is integral with each other and top and bottom portions 12, 18 of the cover assembly 10 are free of seams (i.e., is seamless). Typically, this cover assembly 10 of this alternative configuration of embodiment 1 is formed via a thermoforming process, such as plug assist thermoforming. Accordingly, this cover assembly 10 of this alternative configuration of embodiment 1 is typically formed from a single and polymeric material.

Embodiment 2

Figure 15:
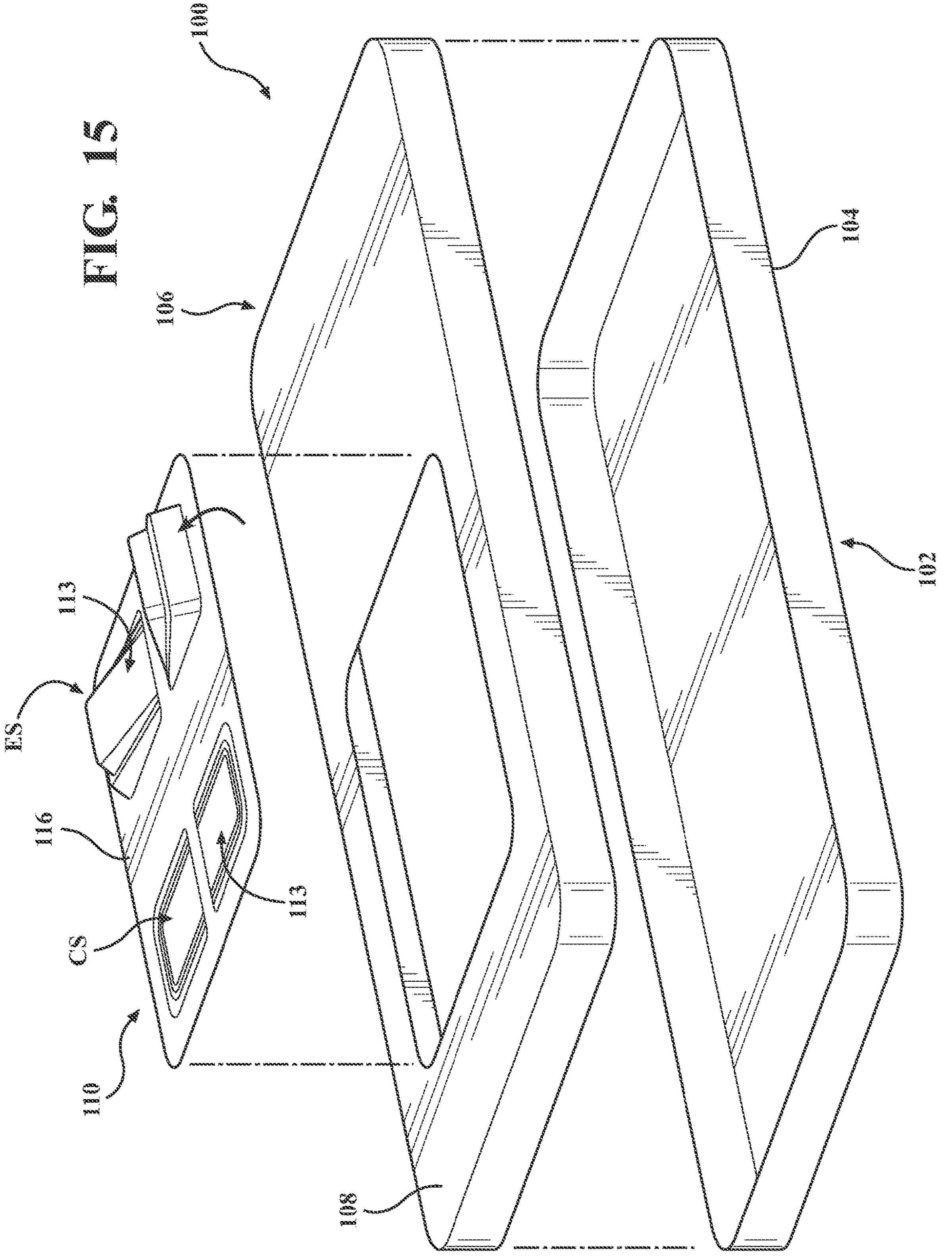
FIG. 15 is an exploded view of the cover assembly with the expandable turn assist module integrated into the bottom portion of the cover assembly.

As shown in FIG. 15, the present disclosure provides a second embodiment of a cover assembly 100 that is different from the cover assembly 10 of the first embodiment. The cover assembly 100 of the second embodiment is for a patient support. The cover assembly 100 includes a top portion 102 defining a patient support surface 104 movable from an initial configuration to a turn assist configuration.

With continued reference to FIG. 15, the cover assembly 100 further includes a bottom portion 106 defining a bottom surface 108 facing opposite from the patient support surface 104. In other words, the bottom surface 108 of the cover assembly 100 faces the floor. The cover assembly 100 further includes an expandable turn assist module 110 integral with the bottom portion 106 such that the expandable turn assist module 110 forms a portion of the bottom surface 108. It should be appreciated that the cover assembly of FIG. 15 is shown with the bottom portion 106 positioned above the top portion 102 for the purpose of displaying the expandable turn assist module 110.

The expandable turn assist module 110 is operable in a collapsed state (CS) and an expanded state (ES). The patient support surface 104 is configured to be in the initial configuration when the expandable turn assist module 110 is in the collapsed state (CS) and the patient support surface 104 is configured to be in the turn assist configuration when the expandable turn assist module 110 is in the expanded state (ES).

Referring back to the patient support, the patient support is typically a crib assembly including a mattress with the bottom portion 106 and top portion 102 of the cover assembly 100 cooperating to enclose the crib assembly. Suitable examples of crib assemblies are disclosed in U.S. patent application Ser. No. 16/585,282 filed on Sep. 27, 2019 and U.S. patent application Ser. No. 16/585,641 filed on Sep. 27, 2019, both of which are incorporated by reference in their entirety. The patient support is typically supported on a patient support apparatus (not shown) such as a hospital bed, stretcher, cot, trolley, gurney, wheelchair, recliner, chair, table, or other suitable support or transport apparatus.

Because the expandable turn assist module 110 is integral with the bottom portion 106 of the cover assembly 100 and forms a portion of the bottom surface 108, when the expandable turn assist module 110 is in the collapsed state (CS), the bottom surface 108 of the cover assembly 100 is uniformly supported by the patient support apparatus. That is, when the expandable turn assist module 110 is in the collapsed state (CS), essentially all of the surface area of the bottom surface 108 contacts, and is supported uniformly by, the patient support apparatus. In contrast, when the expandable turn assist module 110 is in the expanded state (ES), a portion of the bottom surface 108 of the cover assembly 100 is elevated from (i.e., does not contact) the patient support apparatus and consequently the patient support surface 104 is in a turn assist configuration.

Figure 5:
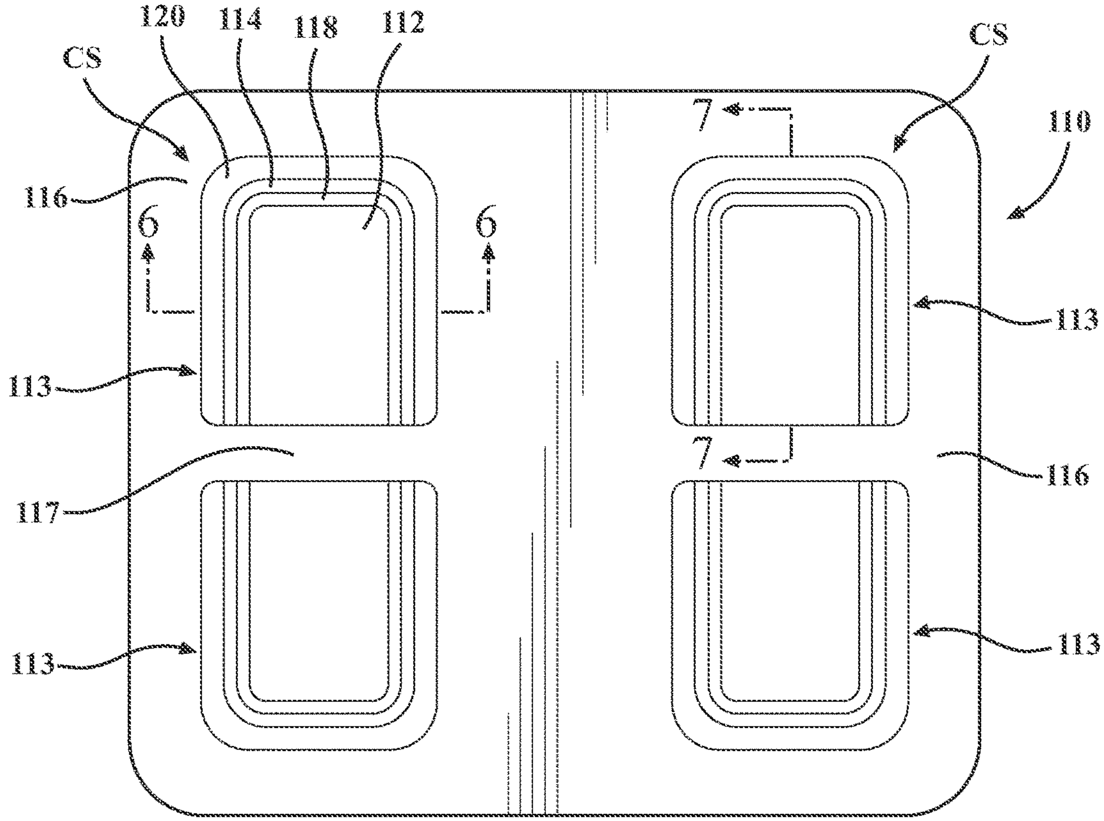
FIG. 5 is a top view of an expandable turn assist module of a second embodiment of a cover assembly with the expandable turn assist module in a collapsed state.
Figure 14:
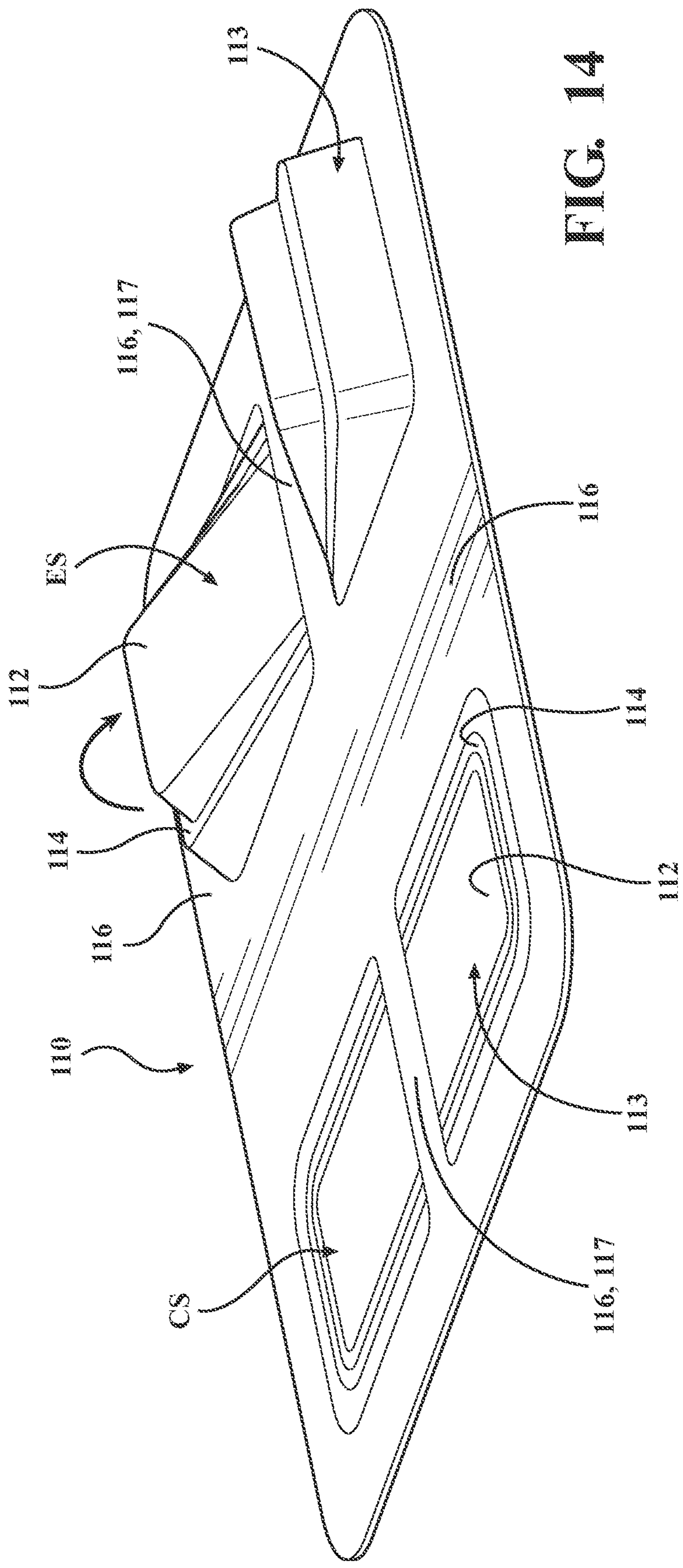
FIG. 14 is perspective view of the expandable turn assist module with two turn bladders in expanded states and two turn bladders in a collapsed state.

As best shown in FIGS. 5, 14, and 15, the expandable turn assist module 110 may include one or more turn bladders 113. Typically, the expandable turn assist module 110 includes 2 or 4 turn bladders 113. Generally, each turn bladder 113 is configured to be arranged in fluid communication with a fluid source (not shown) for selectively being inflated and deflated. The expanding of the turn bladder 113 is synonymous with the expanded state (ES) of the expandable turn assist module 110 and moves a corresponding portion of the patient support surface 104 and the crib assembly away from the patient support apparatus to the turn assist configuration, for example, to provide movement therapy to the patient.

Forming the expandable turn assist module 110 to be integral with the bottom surface 108 of the bottom portion 106 of the cover assembly 100 is advantageous because it simplifies the assembly of the patient support. In particular, convention patient supports require careful assembly and alignment of multiple components to properly align and position conventional turn bladders within the patient support. In addition, conventional turn bladders may also shift within conventional patient supports, and thus require realignment. In contrast, the cover assembly 100 of this embodiment eliminates the need to align and position turn bladders within the patient support because its turn bladders 113 are integral with the cover assembly 100, and thus pre-positioned/aligned within the cover assembly 100 and consequently precluded from shifting.

Although the geometry of the expandable turn assist module 110 is not particularly limiting, to effectively administer turn assist therapy, the individual turn bladders 113 of the expandable turn assist module 110 typically have a wedge shaped configuration when the expandable turn assist module 110 is in the expanded state (ES).

The expandable turn assist module 110 typically includes a bottom module surface 112. As best shown in FIG. 5, the expandable turn assist module 110 may also include a bottom floor 116 surrounding or flanking each turn bladder 113 of the expandable turn assist module 110. It is to be appreciated that the bottom floor 116 (FIG. 5) is an extension of the bottom surface 108 (FIG. 15) with the distinction being that the bottom floor 116 is specifically included in the expandable turn assist module 110 and the bottom surface 108 refers to the bottom of the bottom portion 106 of the cover assembly 100 as a whole.

When the expandable turn assist module 110 is in the collapsed state (CS), the bottom floor 116 is substantially flush with the bottom module surface 112. However, as best shown in FIGS. 6, 7, and 14, when the expandable turn assist module 110 is in the expanded state (ES), at least a portion of the bottom floor 116 (and bottom surface 108) is elevated from bottom module surface 112.

Figure 10:
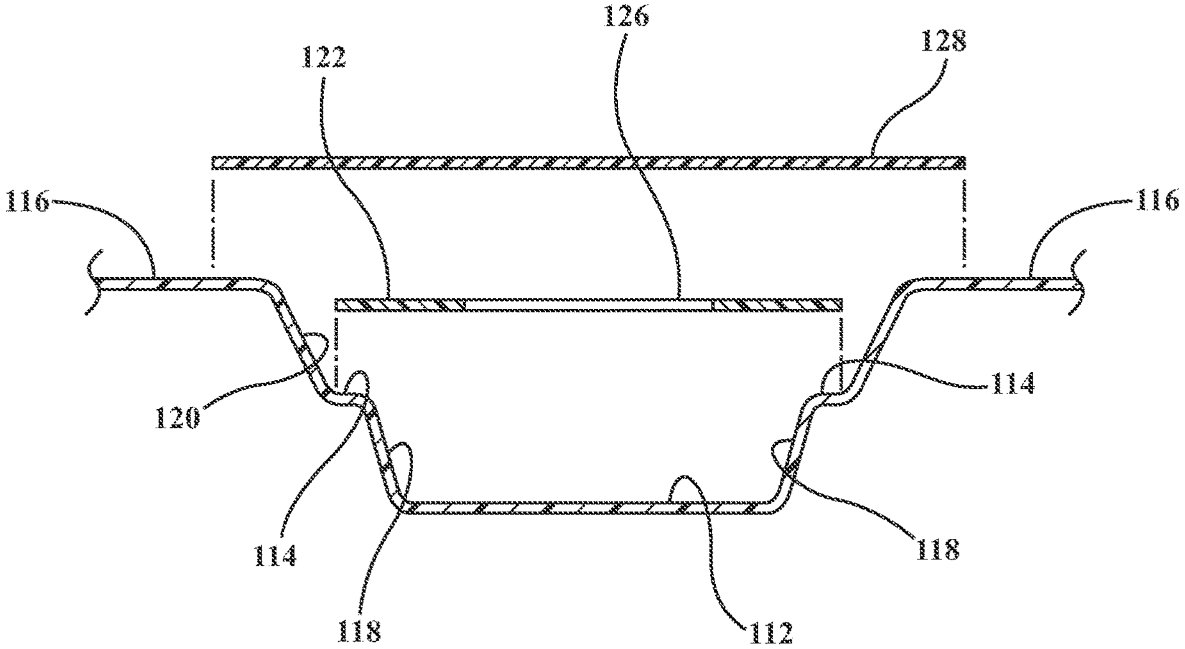
FIG. 10 is an exploded cross-sectional side view of the expandable turn assist module.
Figure 10A:
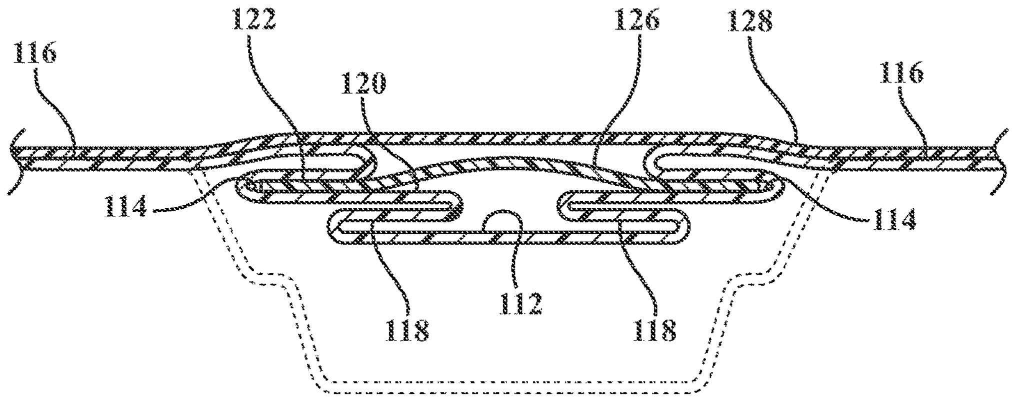
FIG. 10A is a cross-sectional view of the turn assist module of FIG. 10 near a collapsed state.
Figure 11:
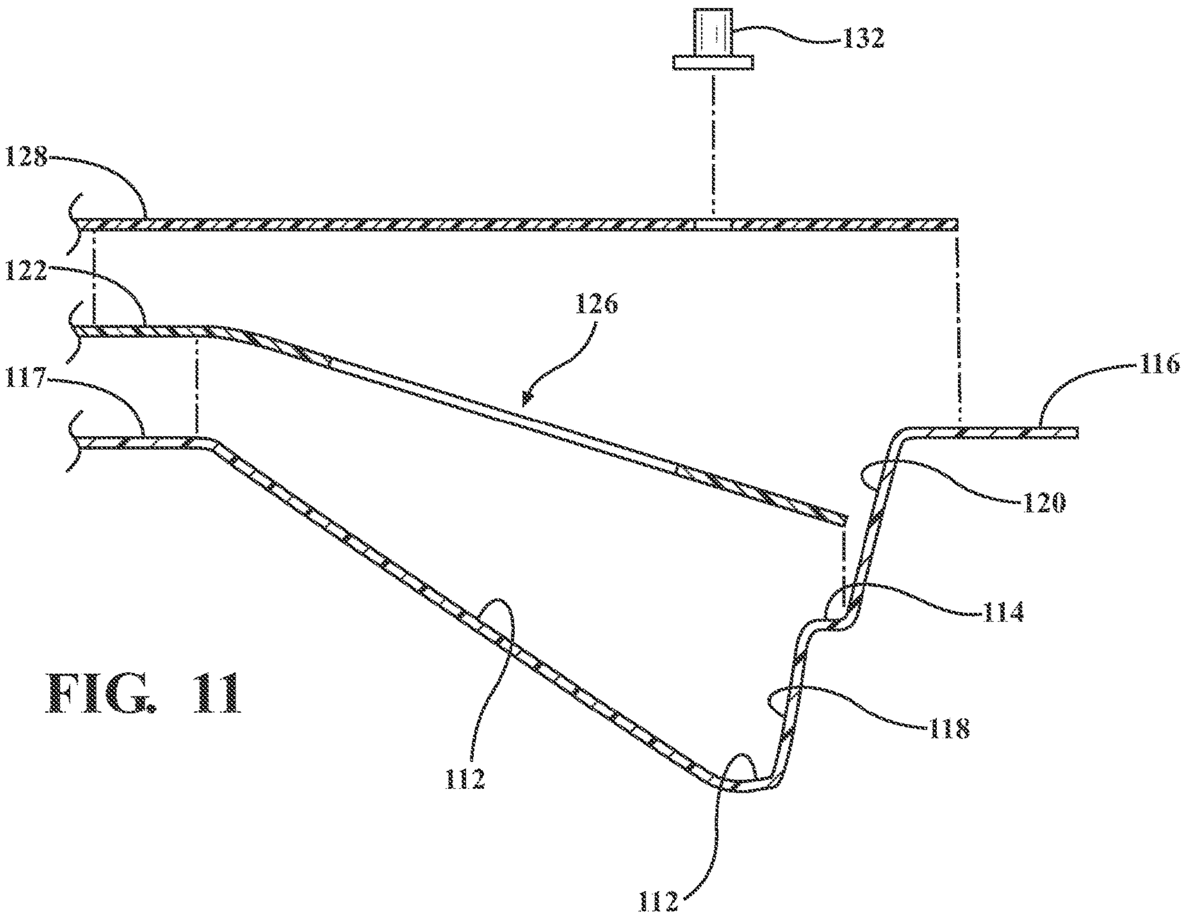
FIG. 11 is another exploded cross-sectional side view of the expandable turn assist module.
Figure 13:
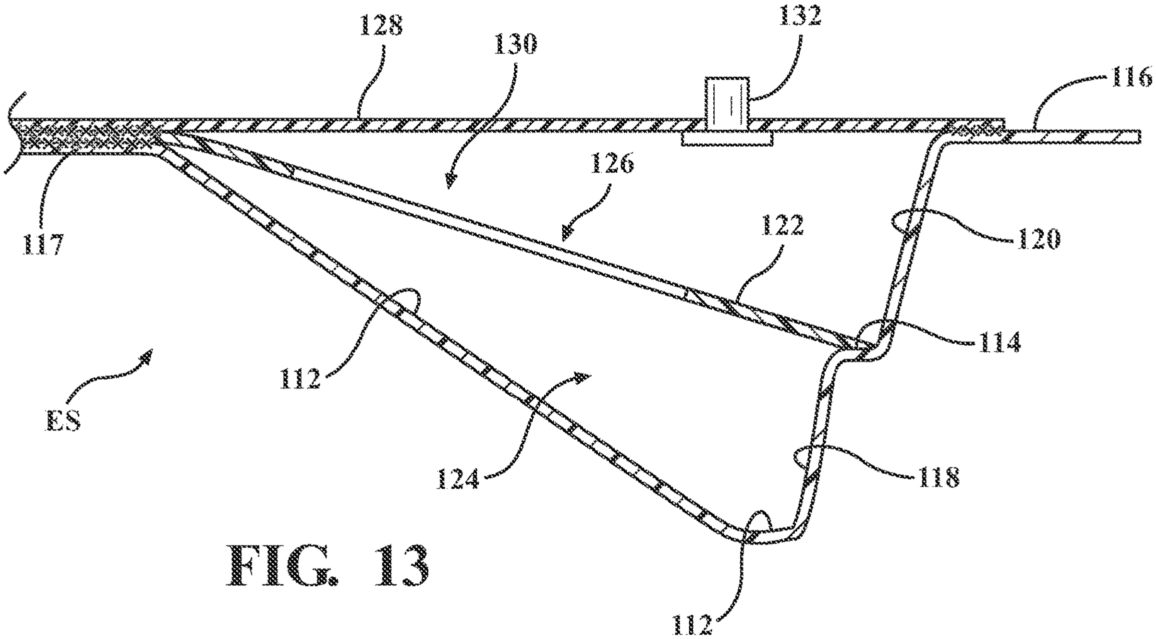
FIG. 13 is another cross-sectional side view of the expandable turn assist module.

Typically, the wedge shape of the turn bladder 113 is configured, at least in part, by transitioning the bottom floor 116 to the bottom module surface 112 at a transition region 117, as shown in FIGS. 11 and 13. It should also be noted that as the expandable turn assist module 110 transitions from the expanded state (ES) to the collapsed state (CS) as fluid is evacuated from the expanded turn assist module 110, the individual turn bladders 113 collapse in an accordion fashion as best shown collectively in FIGS. 10, 10*a*, 11, 11*a*, and 14.

Figure 6:
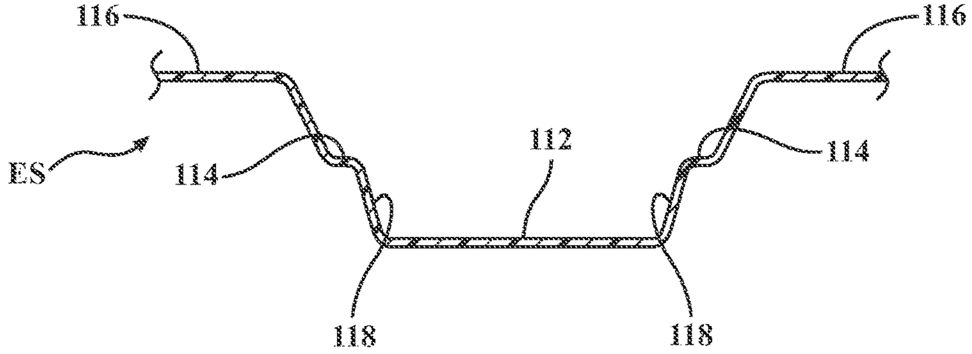
FIG. 6 is a cross-sectional view of the expandable turn assist module of FIG. 5 taken along line 6-6 in FIG. 5.
Figure 7:
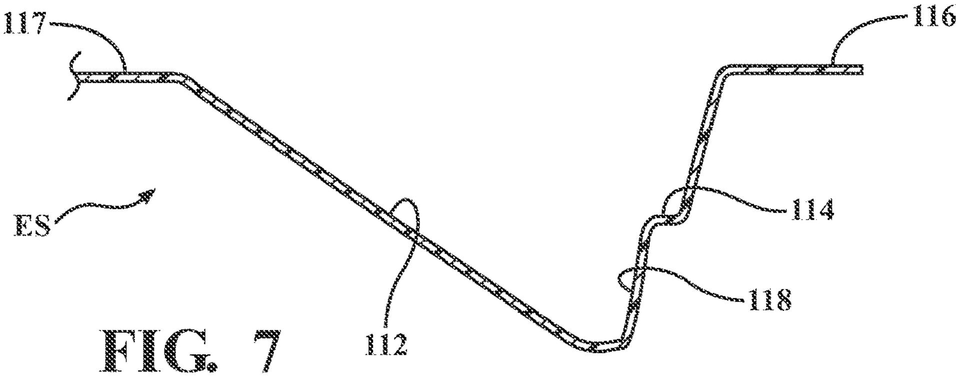
FIG. 7 is a cross-sectional view of the expandable turn assist module of FIG. 5 taken along line 7-7 in FIG. 5.
Figure 8:
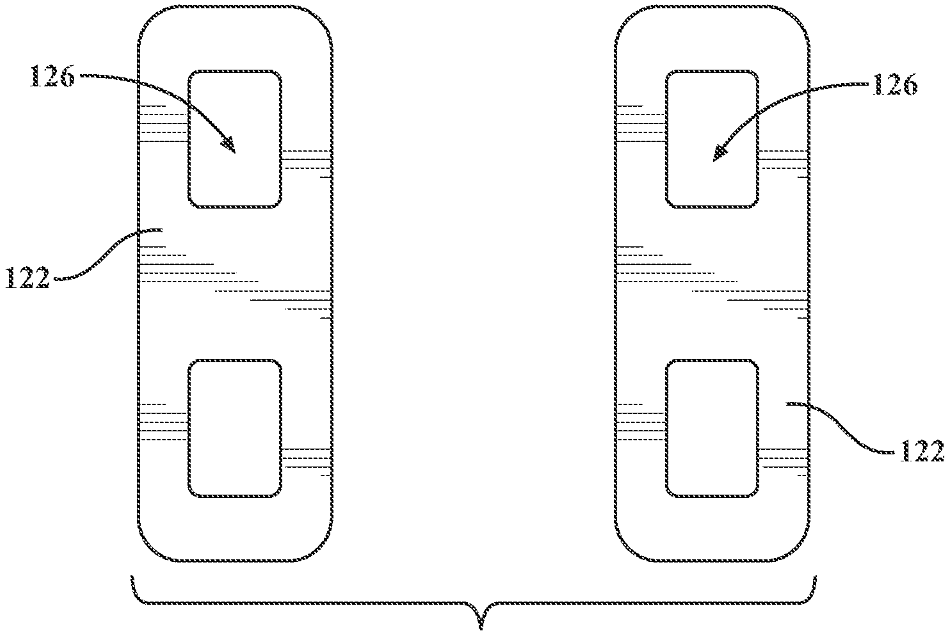
FIG. 8 is a top view of a first sheet of the expandable turn assist module.
Figure 11A:
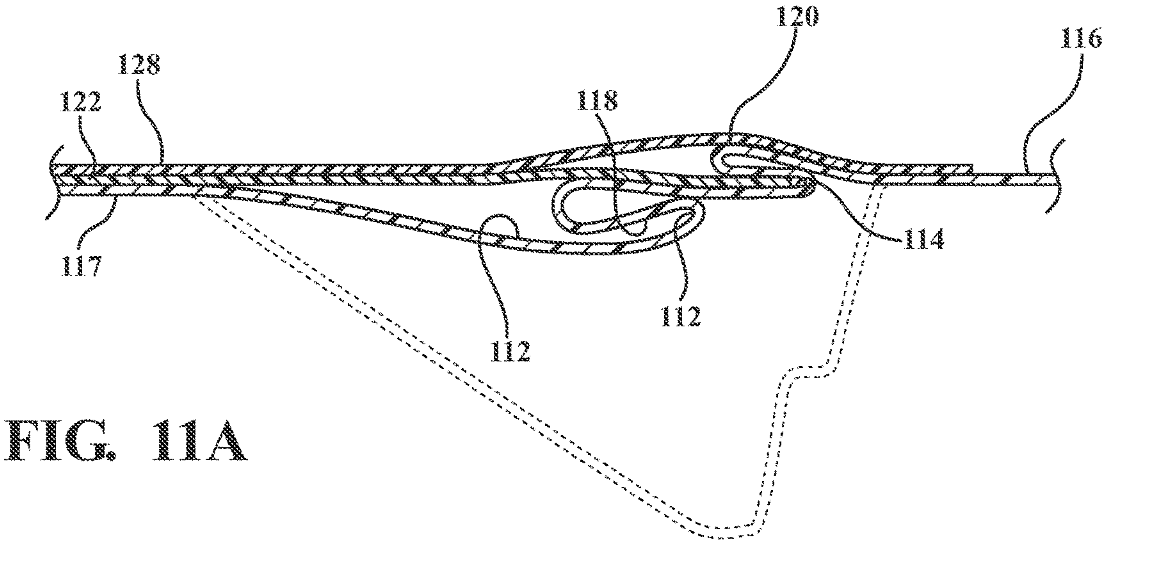
FIG. 11A is a cross-sectional view of the turn assist module of FIG. 11 near a collapsed state.

Referring now to FIGS. 6 and 7, the expandable turn assist module 110 includes a first connection portion 114. The first connection point 114 is joined to the bottom module surface 112 by a first wall 118. As shown in FIGS. 10*a* and 11*a*, at least a portion of the first wall 118 may fold over the bottom module surface 112 when the expandable turn assist module 110 is in the collapsed state (CS). As best shown in FIGS. 10-13, the expandable turn assist module 110 may further include a first sheet 122 disposed above the bottom module surface 112 and coupled to both the first connecting portion 114 and the transition region 117 such that the expandable turn assist module 110 defines a first chamber 124 (FIGS. 12, 13) when the expandable turn assist module 110 is in the expanded state (ES). With reference to FIGS. 8, the first sheet 122 may also include a passage 126 to allow fluid to pass through the first sheet 122.

The expandable turn assist module 110 may further include a second wall 120, with the first wall 118 joining the bottom module surface 112 to the first connecting portion 114 and the second wall 120 joining the first connecting portion 114 to the bottom floor 116. It is to be appreciate that the expandable turn assist module 110 may further include additional connecting portions arranged similar to the first connecting portion 114.

With reference again to FIGS. 10-13, the expandable turn assist module 110 may further include a second sheet 128 disposed above the first sheet 122 and disposed above the bottom module surface 112 to define a second chamber 130 disposed above the first chamber 124 (FIGS. 12, 13). The second sheet 128 is typically coupled to the bottom floor 116 and further coupled to the first sheet 122 above the transition region 117 (FIGS. 11 and 13). As shown in FIG. 11, the second sheet 128 typically includes a port 132 for allowing fluid to enter and exit the second chamber 130.

Although the first and second sheets 122, 128 may be coupled to the expandable turn assist module 110 by any suitable technique, typically, the first and second sheets 122, 128 are radio frequency or ultra-sonic welded to the expandable turn assist module 110.

Figure 9:
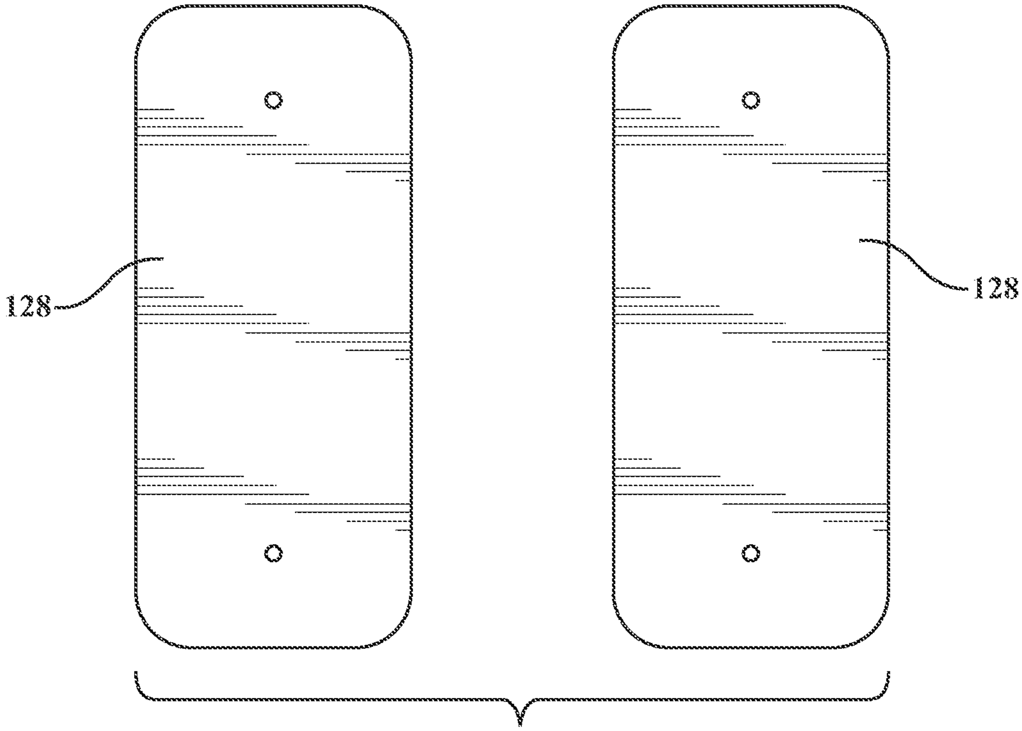
FIG. 9 is a top view of a second sheet of the expandable turn assist module.

As described above, the expandable turn assist module 110 may include multiple turn bladders 113. When multiple turn bladders 113 are included in the expandable turn assist module 110, the first and second sheet 122, 128 may be dimensioned to span two or more turn bladder 113. For example, as shown respectively in FIGS. 8 and 9, the first and second sheets 122, 128 may be dimensioned to span two turn bladders 113.

Figure 12:
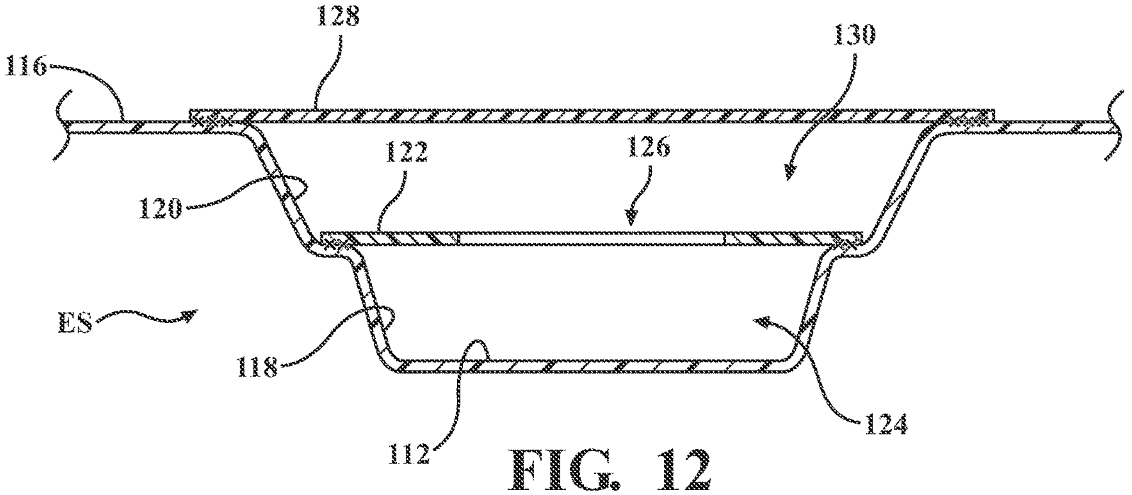
FIG. 12 is a cross-sectional side view of the expandable turn assist module.

With reference to FIGS. 12 and 13, once the first and second sheets 122, 128 are coupled to the expandable turn assist module 110, the first and second chambers 124, 130 are defined. In operation, when the fluid source is activated and supplies fluid to the port 132 of the second chamber 130, fluid enters into the second chamber 130, through the passage 126 in the first sheet 122, and into the first chamber 124. As the fluid continues to enter the second chamber 130, the expandable turn assist module 110 transitions from a collapsed state (CS) to an expanded state (ES), which coincides with the patient support surface 104 moving from the initial configuration to the turn assist configuration. Conversely, once the fluid source stops supplying fluid, fluid flows out of the expandable turn assist module 110 to return the expandable turn assist module 110 to the collapsed state (CS). The fluid can be removed from the expandable turn assist module 110 by any suitable means, such as merely allowing the weight of the patient support to compress the expandable turn assist module 110 or programming the fluid source to pull a vacuum.

The cover assembly 100 typically includes an additional port or connector assembly (not shown) for connecting the fluid source to the cover assembly 100. In addition, the crib assembly (not shown) typically includes structure (e.g. conduit(s)) for transporting the fluid from the fluid source to the port 132 of the second sheet 128.

As best shown in FIG. 5 the first connecting portion 114 typically at least partially flanks or surrounds the bottom module surface 112 in the collapsed state (CS). Referring now to FIGS. 5-7 and the relationship between the bottom module surface 112 and the first connecting portion 114, typically, the bottom module surface 112 is only partially flanked by the first connecting portion 114. For example, when the bottom module surface 112 has four sides as shown in FIG. 5, the first connecting portion 114 does not flank the bottom module surface 112 on each side in the collapsed state (CS). In particular, when the bottom module surface 112 has four sides as shown in FIG. 5, the first connecting portion 114 flanks the bottom module surface 112 on three sides and the remaining side is flanked by the transition region 117.

The cover assembly 100, including the expandable turn assist module 110, is typically formed from a polymeric material capable of being thermoformed. Generally, elastic polymers are preferable for thermoforming. However, care needs to be exercised in selecting a suitable polymer to avoid excessive stretching/elongation of the first and second chambers 124, 130 of the expandable turn assist module 110 in the expanded state (ES). Suitable examples of polymers for use as the polymeric material include, but are not limited to, PVC, thermoplastic polyurethanes (TPUs), polyurethane coated materials (e.g. polyurethane coated PVC), etc.

As shown best in FIG. 15, the expandable turn assist module 110 may be formed and subsequently attached to the bottom portion 106 of the cover assembly 100. Any suitable attachment means may be used, such as, radio frequency or ultra-sonic welding. Of course, the expandable turn assist module 110 may be simultaneously formed with the remainder of the bottom portion 106 of the cover assembly 100 if desired. When formed in this manner, there is no distinction between the bottom surface 108 and bottom floor 116.

The cover assembly 100 may also include a fastening device (not shown) for joining the top portion 102 and bottom portion 106. In one example, the fastening device is a zipper extending about sides of the cover assembly 100. Other fastening devices may include snaps, clips, tethers, hook and eye connections, adhesive, and the like. In addition, a watershed (not shown) may be coupled to the top portion 102 and/or the bottom portion 106 near the fastening device to prevent ingress of fluid and other substances through the fastening device and into the cover assembly 100.

The present disclosure also provides a method for forming the cover assembly 100. The method includes thermoforming a portion of the expandable turn assist module 110. In particular, the portion formed via thermoforming includes the bottom floor 116, the bottom module surface 112, the first connecting portion 114, and the first and second walls 118, 120. The method further includes coupling the first sheet 122 to both the first connecting portion 114 and the bottom floor 116 at the transition region 117 such that the expandable turn assist module 110 defines the first chamber 124 when the expandable turn assist module 110 is in the expanded state (ES). The method further includes coupling the second sheet 128 to the bottom floor 116 and to the first sheet 122 above the transition region 117, such that the second sheet 128 is disposed above the first sheet 122 and disposed above the bottom module surface 112 to define a second chamber 130 disposed above the first chamber 124. Although not required, typically the first and second sheets 122, 128 are attached to the expandable turn assist module 110 by either radio frequency or ultra-sonic welding. The method further includes inserting the port 132 into the second sheet 128. Finally, the method includes coupling the expandable turn assist module 110 to the bottom portion 106 of a cover assembly 100.

Embodiment 3

Figure 16:
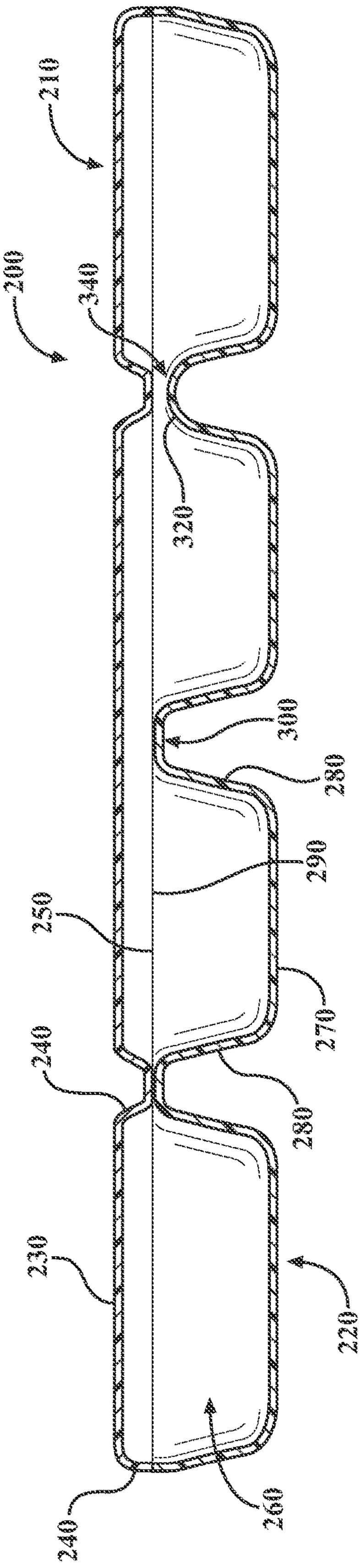
FIG. 16 is a cross-sectional side view of another embodiment of a cover assembly.
Figure 17:
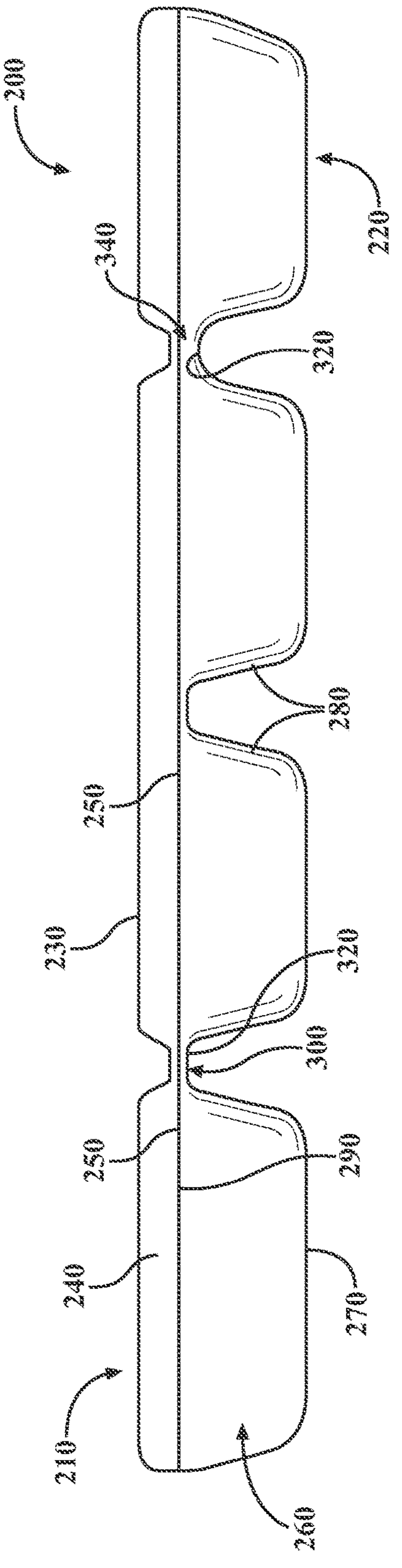
FIG. 17 is a side view of the embodiment of the cover assembly shown in FIG. 16.

As shown in FIGS. 16 and 17, the present disclosure provides a third embodiment of a thermoformed cover assembly 200. The cover assembly 200 includes a first portion 210 and a second portion 220. The first portion 210 defines a patient support surface 230 and a plurality of walls 240 extending away from the patient support surface 230, with plurality of walls 240 having a first sealing region 250. The patient support surface 230 of the first portion 210 of the cover assembly 200 is observable to, and makes contact with, a patient. Typically, the first sealing region 250 is the region of the first portion 210 that couples to the second portion 220, as described further below. The geometry of the first sealing region 250 is not particularly limiting. For example, the first sealing region 250 may be defined as a lip (not shown) on at a distal end of the plurality of walls 240 or the first sealing region 250 may simply be the distal end of the plurality of walls 240.

Referring now to the second portion 220 of the cover assembly 200, the second portion 220 defines at least one open face chamber 260. The configuration of the open face camber(s) 260 relative to the second portion 220 is similar to the open face chamber(s) 20 relative to the bottom portion 18 of the cover assembly 10 described above. For example, the second portion 220 may define from one to eight open face chambers 260. Although there is no limit to the number of open face chambers 260 defined by the second portion 220, typically, the second portion 220 defines three to five open face chambers 260. Each open face chamber 260 includes a floor 270 and a plurality of walls 280 extending from the floor 270 towards the first portion 210, with the plurality of walls 280 extending to and terminating at a second sealing region 290. The first sealing region 250 of first portion 210 and the second sealing region 290 of the second portion 220 are coupled to join the first portion 210 and the second portion 220 to define the cover assembly 200. In other words, the coupling of the first and second portions 210, 220 enclose the cover assembly 200. Said differently still, the first seal sealing region 250 of the first portion 210 and the second sealing region 290 of the second portion 220 are configured to cooperate to join and seal against each other.

The first portion 210 of the cover assembly 200 may be joined, coupled, secured or sealed to the second portion 220 of the cover assembly 200 by any suitable method. For example, similar to the cover assembly 10, radio frequency or ultra-sonic welding techniques may be used to weld the first portion 210 of the cover assembly 200 to the second portion 220 of the cover assembly 200. Typically, when radio frequency or ultra-sonic welding techniques are used, the cover assembly 200 is free of stitching. In these configurations, the first portion 210 and the second portion 220 are integrally joined to each other. Alternatively, an adhesive may be used to couple/secure the first portion 210 of the cover assembly 200 with the bottom portion 220 of the cover assembly 200.

The cover assembly 200 may also include one or more hinges 300 to allow the cover assembly 200 to flex or articulate about the hinge 300. The hinge 300 of the cover assembly 200 is similar in shape and configuration to the hinge 26 described above relative to the cover assembly 10. The hinge 300 may be defined in either the first or second portions 210, 220 or both, but is more commonly defined in the second portion 220. The hinge 300 is integral with the first and/or second portions 210, 220 and divides the respective portion into open faced chambers 260. When included in the second portion 220, the hinge 300 extends towards an apex 320 from the floor 270 towards the first portion 210. The apex 320 may extend all the way to the patient support surface 230 and seal against the patient support surface 230. Alternatively, the hinge 300 may extend towards the patient support surface 230 and terminate at the apex 320 with the apex 320 spaced from the first portion 210, such that a gap 340 is present between the apex 320 and patient support surface 230. In instances where a gap 340 is present, the gap 340 may be at least be partially filled with a foam or other suitable material.

In certain configurations, the second portion 220 includes more than one hinge 300 with at least one apex 320 of one of the hinges 300 coupled directly to (i.e., against) the first portion 210 and with another apex 320 of another hinge 300 separated from the first portion 210 with foam disposed in the gap 340 between the apex 320 and the first portion 210.

Similar to cover assembly 10, cover assembly 200 may also be filled with the support material 28 described above. In other words, the support material 28 is internal to the cover assembly 200 and at least partially fills voids between the first and second portions 210, 220. In addition, similar to cover assembly 10, cover assembly 200 may also include the slot 30 for securing a sheet to the cover assembly 200. Similar still, the cover assembly 200 may be formed of the same materials described above relative to the cover assembly 10. For example, the cover assembly 200, including the first and second portions 210, 220 may be formed by a thermoforming process. When the cover assembly 200 is formed from a thermoforming process, the cover assembly 200 may be generally referred to as the thermoformed cover assembly 200. When the first and second portions 210, 220 are formed in the thermoforming process, the first and second portions 210, 220 are generally free of seams. In other words, each open face chamber 260 of the second portion 220 is formed to be integral with each adjacent open face chambers 260, such that a joining mechanisms (e.g. adhesive, thread, etc.) is not needed to join the open face chambers 260.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A thermoformed cover assembly for a patient support comprising:

- a first portion defining a patient support surface, with a plurality of walls extending away from the patient support surface to a first sealing region; and
- a second portion defining at least one open face chamber with the open face chamber including a floor and a plurality of walls extending from the floor towards the first portion to a second sealing region;
- wherein the first sealing region of the first portion is coupled to the second sealing region of the second portion to enclose the thermoformed cover assembly;
- wherein the floor in the at least one open face chamber defines a length between an adjacent pair of the plurality of walls with the length extending parallel and spaced from the first portion;
- wherein the first portion and second portions of the thermoformed cover assembly are free of seams;

- wherein the second portion defines a hinge and each open face chamber is integral with at least one additional open face chamber by the hinge; and
- wherein at least one hinge extends to an apex and a foam is disposed in a gap defined between the apex of the hinge and the first portion.

2. The thermoformed cover assembly as set forth in claim 1 wherein the plurality of open face chambers of the second portion are spaced from each other along a main axis extending between a foot end of the thermoformed cover assembly towards a head end of the thermoformed cover assembly.

3. The thermoformed cover assembly as set forth in claim 2 wherein each hinge extends horizontally across the thermoformed cover assembly and substantially perpendicular to the main axis.

4. The thermoformed cover assembly as set forth in claim 3 wherein the second portion comprises at least one horizontal expansion portion coupled to an open face chamber through a secondary hinge attached to one of the plurality of walls of the open face chamber adjacent the floor of the open face chamber such that the horizontal expansion portion is capable of rotating about the secondary hinge to cooperate with the patient support surface and support a patient.

5. The thermoformed cover assembly as set forth in claim 1 wherein the second portion comprises at least one horizontal expansion portion coupled to an open face chamber through a secondary hinge attached to the floor of the open face chamber adjacent a wall of the plurality of walls of the open face chamber such that the horizontal expansion portion is capable of rotating about the secondary hinge to cooperate with the patient support surface and support a patient.

6. The thermoformed cover assembly as set forth in claim 1 wherein each open face chamber includes two end walls extending substantially perpendicular to a main axis extending between a foot end of the thermoformed cover assembly and a head end of the thermoformed cover assembly, wherein each open face chamber does not share an end wall with an adjacent open face chamber.

7. The thermoformed cover assembly as set forth in claim 1 wherein the hinge is further defined as a resilient hinge.

8. The thermoformed cover assembly as set forth in claim 1 wherein at least a portion of the hinge is convexly shaped.

9. The thermoformed cover assembly as set forth in claim 1 wherein a sealing surface of the first portion is radio frequency or ultra-sonic welded to at least one hinge of the second portion.

10. The thermoformed cover assembly as set forth in claim 1 wherein the hinge is further defined as a living hinge.

11. The thermoformed cover assembly as set forth in claim 1 wherein the hinge has a constant radius of curvature.

* * * * *